United States Patent
Frank

(10) Patent No.: US 6,904,530 B2
(45) Date of Patent: Jun. 7, 2005

(54) BUS CONTROL MODULE FOR IMPROVING LEGACY SUPPORT

(75) Inventor: Andrew Frank, Woodland Hills, CA (US)

(73) Assignee: Digi International Inc., Minnetonka, MN (US)

( * ) Notice: Subject to any disclaimer, the term of this patent is extended or adjusted under 35 U.S.C. 154(b) by 667 days.

(21) Appl. No.: 09/837,626

(22) Filed: Apr. 18, 2001

(65) Prior Publication Data

US 2002/0026548 A1 Feb. 28, 2002

Related U.S. Application Data

(63) Continuation of application No. 09/551,299, filed on Apr. 18, 2000, now abandoned.

(51) Int. Cl.[7] .............................. G06F 1/26; G06F 3/00
(52) U.S. Cl. ........................... 713/300; 713/310; 710/2; 710/8
(58) Field of Search ................................. 713/300, 310; 710/2, 8, 11, 300

(56) References Cited

U.S. PATENT DOCUMENTS

| | | | |
|---|---|---|---|
| 5,656,869 A | 8/1997 | Gluskoter et al. | ............ 307/64 |
| 5,781,747 A | 7/1998 | Smith et al. | ................. 395/309 |
| 5,799,196 A | 8/1998 | Flannery | ................. 395/750.03 |
| 6,081,856 A * | 6/2000 | Comer | ......................... 710/67 |
| 6,334,160 B1 * | 12/2001 | Emmert et al. | ................ 710/11 |
| 6,438,708 B1 * | 8/2002 | Shinichi et al. | ............... 714/15 |
| 6,549,966 B1 * | 4/2003 | Dickens et al. | ............. 710/300 |

FOREIGN PATENT DOCUMENTS

| | | | |
|---|---|---|---|
| JP | 08-033233 | 2/1996 | ............. H02J/9/06 |

* cited by examiner

*Primary Examiner*—Thomas Lee
*Assistant Examiner*—Nirav Amin
(74) *Attorney, Agent, or Firm*—Schwegman, Lundberg, Woessner & Kluth, P.A.

(57) ABSTRACT

Systems, devices and methods are provided for expanding an interface to a computer. According to one aspect, a device is provided, including a backplane and at least one expansion card. The backplane includes at least one expansion slot and an upstream connector for connecting with the computer. The expansion card is adapted for coupling with the expansion slot. The expansion card includes at least one port to provide an interface with the computer. According to one aspect, an apparatus is provided, including a control module, a hub coupled to the control module and adapted for providing USB/USB+ outputs, and an external functions unit coupled to the hub and adapted for providing outputs.

49 Claims, 4 Drawing Sheets

BUS CONTROL MODULE FOR IMPROVING LEGACY SUPPORT

CROSS REFERENCE TO RELATED APPLICATIONS

This application is a continuation of U.S. patent application Ser. No. 09/551,299, filed on Apr. 18, 2000 now abandoned, the specification of which is incorporated herein by reference.

BACKGROUND (1) Field of the Invention

The invention relates to systems and methods for providing expansion capabilities outside of a personal computer.

(2) Background

Some prior art systems employ an uninterruptible power supply (UPS) in which an alternating current to direct current (AC to DC) converter receives an AC signal, from for example, a wall socket, and converts the signal to DC which is used to charge a battery within the UPS. A DC signal is reconverted to AC and supplied back out to connected devices. In the event of a power outage, the UPS permits an orderly shut down of the system by supplying power previously stored in the battery. Typically, external devices expect to receive 220 or 110 volts AC from a standard electrical outlet. The battery power is converted from DC to the expected 110 or 220 volts AC. Such devices typically each have their own internal AC to DC converter. Using that converter, the power supplied is again converted to DC for use in the device.

The traditional personal computer (PC) or workstation market is based on expansion capability of the unit. This has typically included such bussing structures as ISA, EISA and PCI, as well as PCMCIA cards, all of which fall under the broad category of legacy expansion methods. Price pressures and size reduction demands have necessitated providing for relatively small number of external connectivities. The recent trend has been to move the PC in the direction of a sealed box. This trend tends to increase the relative difficulty of power management of the overall system, as well as legacy support.

BRIEF SUMMARY OF THE INVENTION

According to one aspect, a device is provided, including a backplane and at least one expansion card. The backplane includes at least one expansion slot and an upstream USB connector for connecting with the computer. The expansion card is adapted for coupling with the expansion slot. The expansion card includes at least one port to provide an interface with the computer.

According to one aspect, an apparatus is provided, including a control module, a hub coupled to the control module and adapted for providing USB/USB+ outputs, and an external functions unit coupled to the hub and adapted for providing outputs.

DETAILED DESCRIPTION

Figure 1:
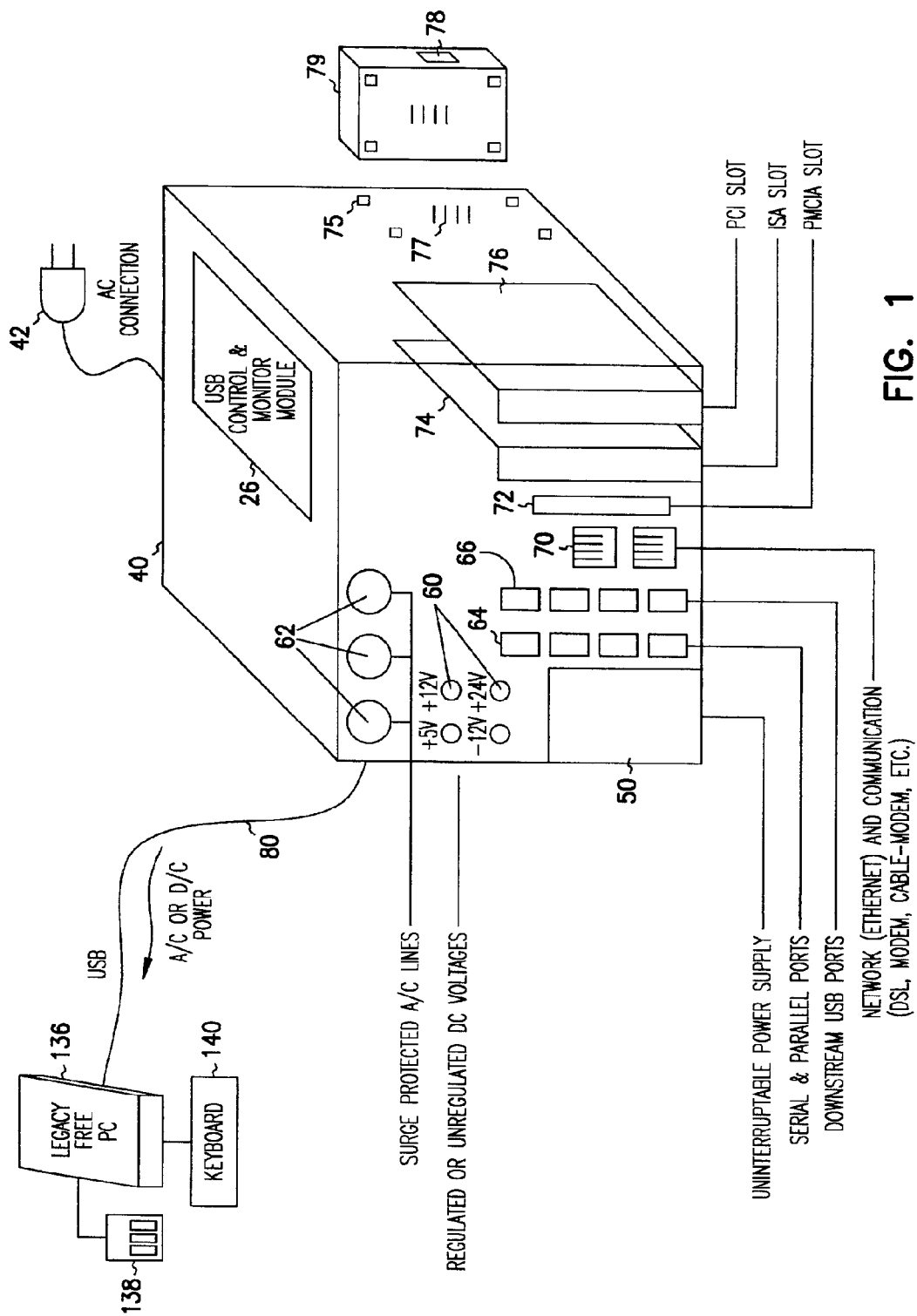
FIG. 1 is a schematic diagram of a system of one embodiment of the invention.

FIG. 1 is a schematic diagram of a system of one embodiment of the invention. A legacy free PC 136 has coupled thereto a mouse 138 and a keyboard 140. The legacy free PC provides at least one external connectivity (in this embodiment, USB). Accordingly, the legacy free PC 136 is coupled to a combined uninterruptible power supply and bus control module contained within the housing 40. The USB connection 80 provides both the USB signaling as well as power to the legacy free PC 136. In addition to the uninterruptible power supply 50 and the USB control and monitor module 26, support for alternative connectivities and various legacy expansion systems may be provided within the housing 40. For example, the housing may be equipped with various serial or parallel ports 64, additional downstream USB ports 66, as well as network and communications ports, such as Ethernet ports, DSL modem or cable modem ports 70. Additionally, the housing may be equipped with a PCMCIA slot 72, an ISA slot 74, a PCI slot 76, or any other legacy support slot. Various regulated or unregulated DC voltages can be supplied to external nodes 60. Additionally, surge protected AC lines 62 may be provided to which external devices may be coupled. A standard power cord 42 may provide AC connection via a standard wall socket.

It is also within the scope and contemplation of the invention for various legacy support modules 79, such as support for PCI or ISA to be fabricated to modularly attach to the housing 40. In such embodiments, housing 40 provides coupling points 75 for engagement by the snap-on modules 79. Mechanical and electrical connections 77 on the housing 40 retain each module firmly in place while providing power and communication between the module and the main unit. Power and communication may be provided through a USB link in one embodiment of the invention. The housing 40 may also provide connection ports for non-legacy I/O, such as USB or 1394 buses. In this manner, an extra port 81 may be modularly added to the unit.

Figure 2:
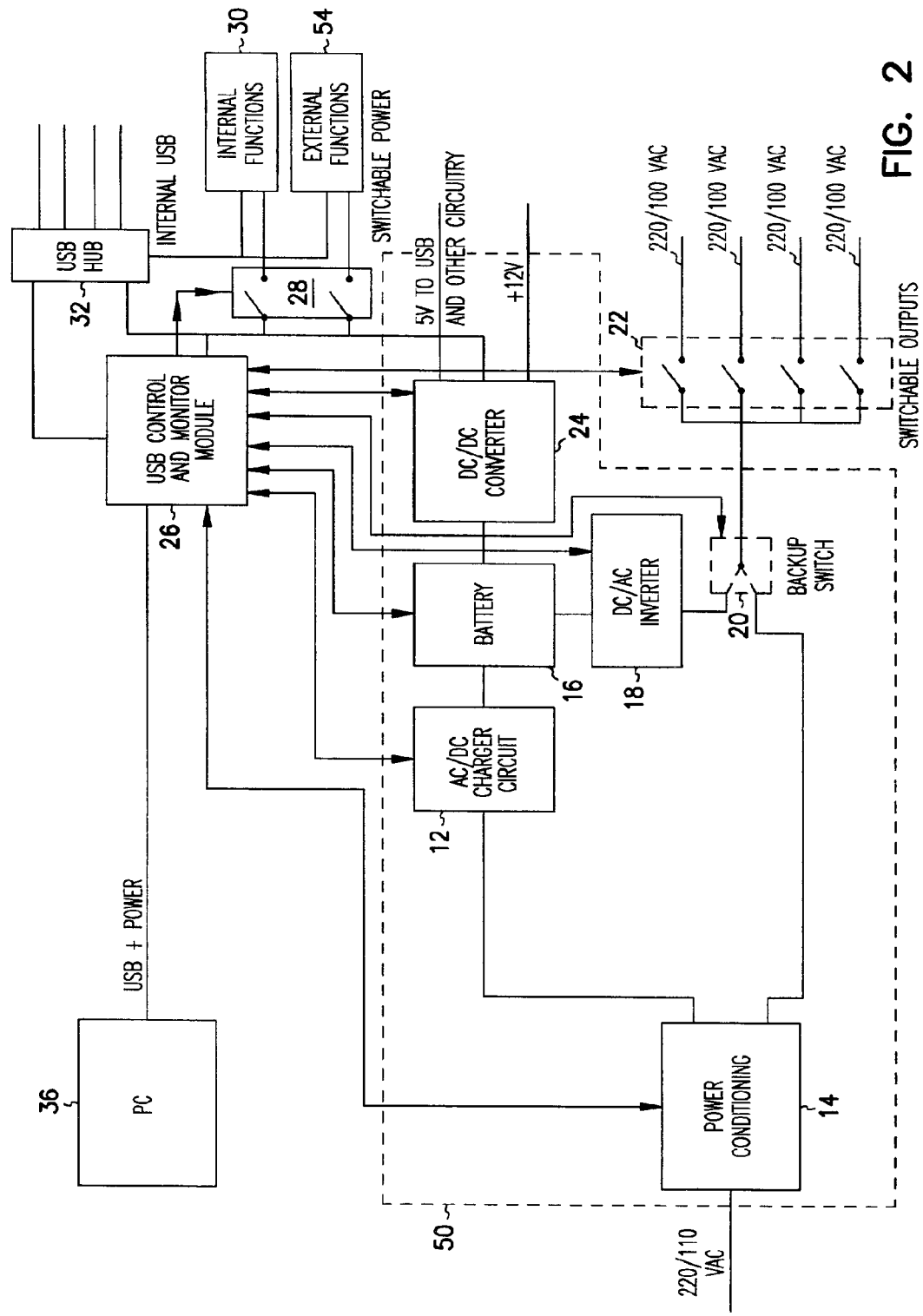
FIG. 2 is a block diagram of a system of one embodiment of the invention.

FIG. 2 is a block diagram of a system of one embodiment of the invention. PC 36 is coupled to a USB controller monitor module 26 through which PC 36 is supplied external connectivity and power. PC 36 may be, but need not be, a legacy free PC. In this figure, unless otherwise specified, power distribution lines are represented by thick lines, while thin lines represent control or signal lines. An incoming power signal, typically 220 or 110 volts AC, is supplied to the power conditioning circuit 14. The power conditioning circuit 14 may provide surge protection. In some embodiments, the power conditioning circuit 14 may also provide power phase correction. The output is supplied to AC/DC charger circuit 12 which converts the AC power signal into DC and uses the DC to charge battery 16. The output of the power conditioning circuit 14 is also supplied to a backup switch 20 that is provided between power conditioning circuit 14 and a set of switchable power output nodes. Backup switch 20 selects which of the power conditioning circuit 14 and the battery 16 supply power to the output nodes. In the event of a power failure, battery 16 supplies power through DC/AC inverter 18. DC/AC inverter 18 converts the battery power supplied to the output nodes 110/220 VAC.

In any case, the battery 16 supplies power to a DC/DC converter 24 which generates desired DC voltages, such as +5 volts, for use by USB and other circuitry. Moreover, by supplying devices with DC rather than AC additional conversion steps are avoided. Since current external devices expect AC, integration of the USB hub and functions with the control module and UPS permits those devices to be supplied DC directly reducing system costs.

It is also within the scope and contemplation of the invention to supply the PC 36 with DC power via the control and monitor module 26. Alternatively, the power supplied to the PC may be the traditional 220 or 110 volts AC. The USB and monitor module 26 monitors each subunit of UPS 50. Additionally, the control and monitor module 26 controls a plurality of switches 22 which provide external power. Thus, in low power modes, the control and monitor module can select to leave one, all, none, or any combination of the externally powered devices powered. Control and monitor module also controls and monitors the power supplied to internal functions 30 and external modems 54, as well as USB hub 32. By providing additional independently controllable switches 28, internal functions 30 may be powered or left unpowered depending on the desired power state of the system.

Firmware within the control and monitor module can provide legacy conversion from various legacy protocols to USB so that data received using such legacy protocols can be forwarded to the PC over the USB link for processing.

By moving the legacy support to an external module outside of the PC, cost and size of the PC is diminished. Additionally, by providing control of each subunit and each external connection through a central control and monitor module, control of the overall power consumption of the system is facilitated. Moreover, while legacy support can be moved outside the PC, the UPS and control unit also serves as an ideal connection point for non-legacy devices.

Figure 3:
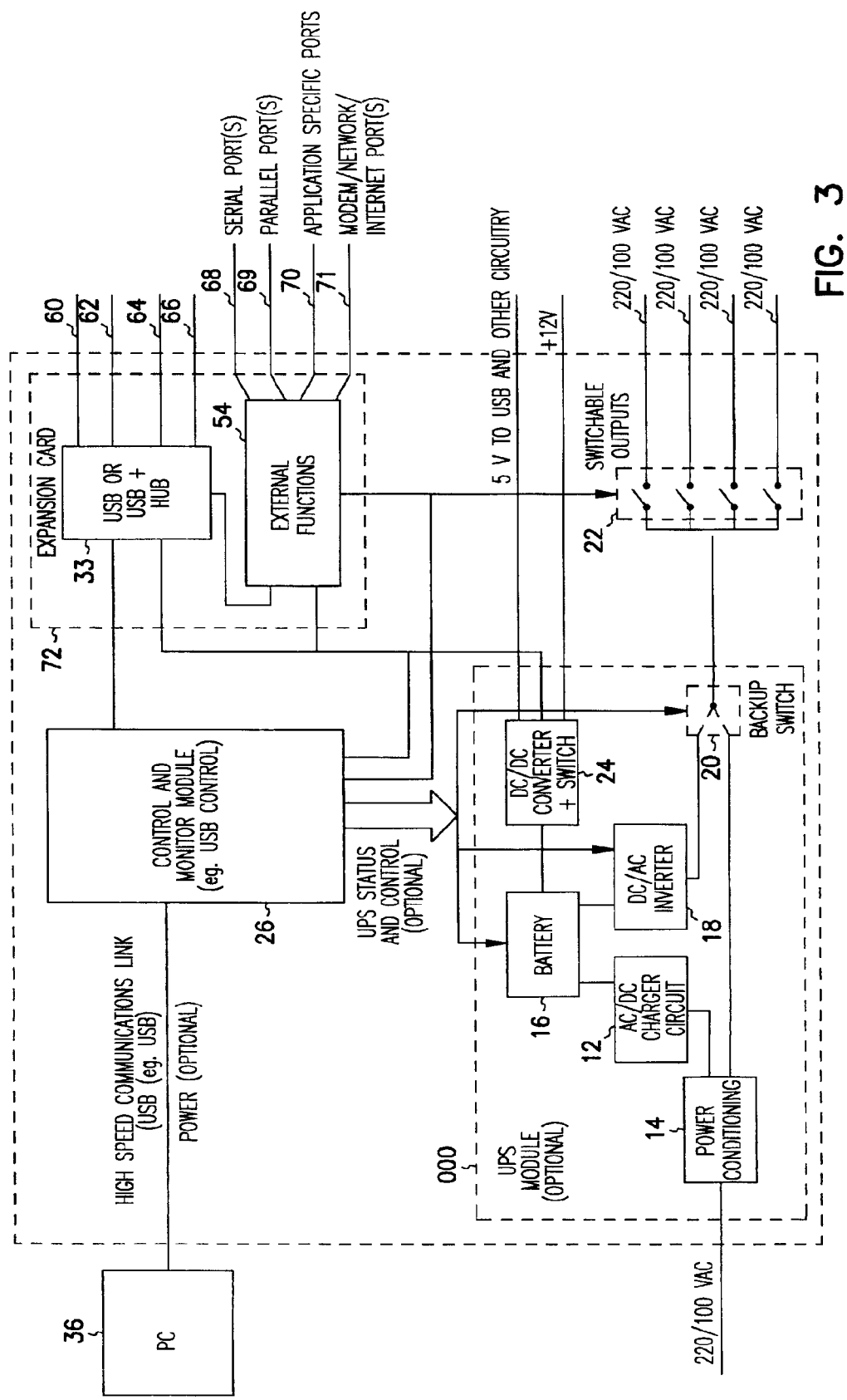
FIG. 3 is a block diagram of a system of another embodiment of the invention.

FIG. 3 is a block diagram of a system of another embodiment of the invention. In this embodiment, the hub 33 is a USB/USB+ hub with USB/USB+ outputs 60, 62, 64 and 66. According to one embodiment, the external functions provide serial port(s) 68 and application specific port(s). According to one embodiment, the serial port(s) 68 include powered and non-powered RS232. According to other embodiments, the external functions include parallel port(s) 69, and modem, network and/or Internet port(s) 71. The USB/USB+ hub 33 and the external functions unit 54 are represented within an expansion card 72, which is described in more detail below with respect to FIG. 4.

Figure 4:
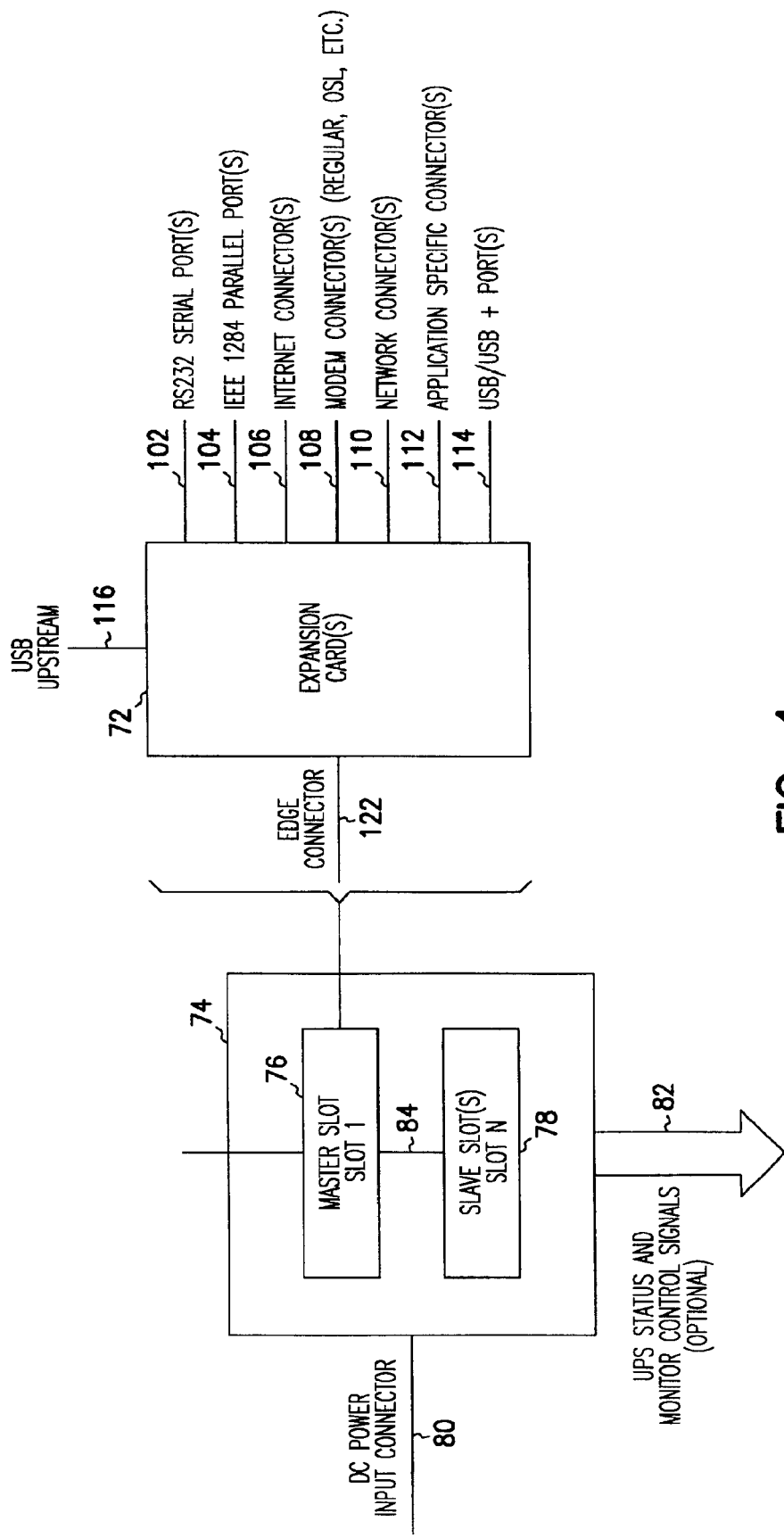
FIG. 4 is a block diagram of a mechanical implementation that includes a backplane with two expansion slots for expansion cards.

FIG. 4 is a block diagram of a mechanical implementation that includes a backplane 74 with expansion slots 76 and 78 for expansion cards 72. The backplane 74 contains a DC power input connector 80, and a UPS control/status/I/O connector 82. According to one embodiment, the backplane 74 includes two or more expansion slots for the expansion cards 72. One of the expansion slots is the Master slot 76 while the remaining one or more expansion slots are Slave slot(s) 78. The Master slot 76 is connected to the Slave slot(s) 78 via a communication link 84 such as a USB signal pair. An expansion card 72 is inserted into the Master slot 76, and other card(s) 72 are able to be inserted into the Slave slot(s) 78. According to one embodiment, the expansion cards 72 are "plug-n-play" cards. The Master slot 76 is always populated. If both the Master and Slave slot(s) 76 and 78 are populated, multiple cards 72 are able to communicate via the communication link 84.

Each slot 76 and 78 has a slot identification signal that allows expansion card firmware to determine if the expansion card 72 is a Master 76 or a Slave 78 card. There is no need for any hardware modification to set up a Master or a Slave device. The Master card's upstream USB connection 84 comes from an external device while the Slave card's USB upstream connection comes from the Master card, both through the backplane 74. According to one embodiment, the Master slot 76 contains one upstream (from an external device) and one downstream (to the Slave slot) USB connection (from the Master slot). The Master slot also contains UPS status and control signals.

According to one embodiment, the expansion card 72 is a USB card that is capable of being plugged into one of the expansion slots 76 or 78 of the backplane 74. According to one embodiment, the expansion card 72 provides combinations of one or more of the following: legacy RS232 serial port(s) 102; legacy IEEE 1284 parallel port(s) 104; Internet connector(s) 106; modem connector(s) 108 for a regular modem or DSL modem; network connector(s) 110; or application specific connector(s) 112; and USB/USB+ expansion ports.

The expansion card 72 is powered from the backplane board 74. As such, it draws no power from the upstream USB port, and reports itself as a self-powered device to the operating system. The USB Upstream port 116 provides a data connection to the host computer. According to one embodiment, it draws no power from the USB cable. The USB Upstream port is not connected directly to the upstream port of the internal USB function. It is routed to the backplane board instead where it is routed back to the upstream port of the internal USB function in the Master slot and not connected anywhere in the Slave slot(s). This allows the same cards to be used in both the Master and the Slave slots. The USB/USB+ Downstream port(s) 114 provide a data connection or both a data and a power connection to an external USB device. RS232 serial port(s) 102 and IEEE 1284 parallel port(s) 104 provide legacy connectivity for the host computer.

An edge connector 122 connects the expansion card 72 to the backplane board 74. The backplane board 74 carries the power and power return lines for both Master and Slave slots. Furthermore, according to one embodiment, the backplane board 74 carries the status and control lines of the UPS for the Master slots, the USB signals between the USB connector and the Master slot, the USB signals between the Master and Slave slots, and the slot identifier signal for the Master and Slave slots.

According to other embodiments, the expansion card 72 supplies a number of additional I/O signals that are read using an "out-of-band" mechanism separate from the UART (Universal Asynchronous Receiver/Transmitter) ports provided on the card. This mechanism is supplied by a number of "virtual" COM ports which enable application software to monitor and control the additional I/O functions. In general, application software may treat a "virtual" COM port in the same way as a real COM port using standard API (Application Programming Interface) functions.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:
1. A device, comprising:
 a backplane with at least one expansion slot and with an upstream connector for connecting with a computer via a serial bus, wherein the device is external to the computer;

at least one expansion card for coupling with the expansion slot, the expansion card including at least one port to provide an interface with the computer through the serial bus; and an uninterruptible power supply (UPS) connected to the backplane, wherein the backplane is adapted to provide power to the computer through the upstream connector, and to communicate UPS status and control data with the UPS.

2. The device of claim 1, wherein the at least one expansion card includes at least one USB+ port.

3. The device of claim 2, wherein the at least one expansion card includes at least one USB port.

4. The device of claim 1, wherein the at least one expansion card includes at least one serial port.

5. The device of claim 1, wherein the at least one expansion card includes at least one parallel port.

6. The device of claim 1, wherein the at least one expansion card includes at least one application specific port.

7. The device of claim 1, wherein at least one the expansion card includes:
at least one USB+ port;
at least one RS232 serial port; and
at least one IEEE 1284 parallel port.

8. The device of claim 1, wherein the at least one expansion card further includes at least one modem connector.

9. The device of claim 1, wherein the at least one expansion card further includes at least one network connector.

10. The device of claim 1, wherein the at least one expansion card further includes at least one connector for connection to Internet.

11. The device of claim 1, wherein the backplane includes a master slot coupled to at least one slave slot via a communication link.

12. An apparatus, comprising:
a control module, including a port to provide both serial communication and power to a computer external to the apparatus;
an uninterruptible power supply (UPS) coupled to and controlled and monitored by the control module, the control module including at least one port to provide UPS status and control communication with the UPS, the UPS to provide power to the computer via the control module;
a hub for providing USB/USB+ outputs, the hub being coupled to the control module; and
an external functions unit to provide legacy expansion for the computer through the serial communication link, the external functions unit being coupled to the hub.

13. The apparatus of claim 12, wherein the communication link includes a USB link.

14. The apparatus of claim 12, wherein the control module includes at least one port for providing UPS status and control communication.

15. The apparatus of claim 12, wherein the external functions unit provides at least one serial port.

16. The apparatus of claim 15, wherein the external function unit provides at least one parallel port.

17. The apparatus of claim 12, wherein the external functions unit provides at least one application specific control.

18. The apparatus of claim 12, wherein the external function unit provides at least one modem port.

19. The apparatus of claim 12, wherein the external function unit provides at least one network port.

20. The apparatus of claim 12, wherein the external function unit provides at least one Internet port.

21. The apparatus of claim 12, wherein the UPS includes:
an alternating current (AC) to direct current (DC) converter to receive an AC power signal from an external source;
a battery coupled to the AC/DC converter; and
a DC/DC converter to convert a DC signal of the AC/DC converter into at least a first predetermined DC voltage for use by a device external to the apparatus.

22. The apparatus of claim 21, wherein the UPS further includes:
a charger circuit coupled between the AC/DC converter and the battery to charge the battery from an incoming power signal; and
a power conditioning circuit coupled to the AC/DC converter to pass the incoming power signal through to an output node.

23. The apparatus of claim 22, wherein the UPS further includes:
a DC/AC converter coupled to the battery; and
a switch coupled between the DC/AC converter and the power conditioning circuit to select which of the battery and the power conditioning circuit can supply power to the output node.

24. The apparatus of claim 23, wherein the bus control module is coupled to monitor subunits of the UPS and controls the switch.

25. The apparatus of claim 12, further including a plurality of switches independently controlled by the control module to select which of a plurality of output lines are supplied power by the UPS.

26. The apparatus of claim 12, further including a housing containing the UPS, control module and the hub.

27. The apparatus of claim 26, wherein the housing further includes a plurality of expansion slots.

28. The apparatus of claim 26, wherein the housing includes connection points for coupling an expansion module to the housing.

29. A system comprising:
a legacy free personal computer (PC);
a housing containing an uninterruptible power supply (UPS), a bus monitor and control module connected to the UPS, a USB/USB+ hub, and an external functions unit to provide legacy expansion for the PC; and
a serial bus coupling the PC to the bus monitor and control module, wherein the bus monitor and control module distributes direct current (DC) power from the UPS to the PC over the bus.

30. The system of claim 29, wherein the bus is a Universal Serial Bus (USB).

31. The system of claim 29, wherein the control module includes at least one port for providing UPS status and control communication.

32. The system of claim 29, wherein the hub provides at least one USB port and at least one USB+ port.

33. The system of claim 29, wherein the external functions unit provides at least one serial port.

34. The system of claim 33, wherein the external functions unit provides at least one parallel port.

35. The system of claim 33, wherein the external functions unit provides at least one modem port.

36. The system of claim 33, wherein the external functions unit provides at least one application specific port.

37. The system of claim 33, wherein the external functions unit provides at least one network port.

38. The system of claim 33, wherein the external functions unit provides at least one Internet port.

39. A method, comprising:
  providing a serial communication link to a computer;
  providing a device external to the computer for coupling to the serial communication link, including:
    providing an uninterruptible power supply (UPS);
    providing a backplane connected to the UPS with a port to provide UPS status and control communication for the UPS, with at least one expansion slot and with an upstream connector for coupling to the serial communication link to serially communicate with the computer and provide power from the UPS to the computer; and
    providing at least one expansion card for coupling with the expansion slot, including providing at least one port as an interface for the computer.

40. The method of claim 39, wherein providing at least one expansion card includes providing at least one USB port.

41. The method of claim 39, wherein providing at least one expansion card includes providing at least one USB+ port.

42. The method of claim 39, wherein providing at least one expansion card includes providing at least one serial port.

43. The method of claim 39, wherein providing at least one expansion card includes providing at least one parallel port.

44. The method of claim 39, wherein providing at least one expansion card includes providing at least one application specific port.

45. The method of claim 39, wherein providing at least one expansion card includes providing at least one connection for connection to Internet.

46. The method of claim 39, wherein providing at least one expansion card includes providing at least one modem connection.

47. The method of claim 39, wherein providing at least one expansion card includes providing at least one network connection.

48. A device for expanding a computer interface, comprising:
  an upstream connector for connecting to a computer through a Universal Serial Bus (USB) using a USB protocol, wherein the device is external to the computer;
  a PCI bus structure having a PCI protocol;
  a bus control module connected to the upstream connector and to the PCI bus structure, wherein the bus control module is adapted to provide a protocol conversion between the USB protocol and the PCI bus protocol;
  a master slot and at least one slave slot connected to the PCI bus structure; and
  an uninterruptible power supply (UPS), wherein the bus control module is connected to the UPS and is adapted to provide power from the UPS to the computer through the upstream connector.

49. A method, comprising:
  providing an upstream connector, a PCI bus structure and an uninterruptible power supply (UPS) in a device external to a computer, wherein the PCI bus structure has a PCI bus protocol;
  providing a master expansion slot and at least one slave expansion slot connected to the PCI bus structure;
  providing power from the UPS to the computer through the upstream connector;
  using a USB protocol to communicate between the device and the computer through the upstream connector; and
  converting the USB protocol to the PCI bus protocol for use by at least one expansion slot to provide legacy expansion support.

* * * * *